United States Patent [19]
Anderson

[11] Patent Number: 5,639,193
[45] Date of Patent: Jun. 17, 1997

[54] CYLINDRICAL CUTTER

[75] Inventor: James R. Anderson, Menominee, Mich.

[73] Assignee: Evergreen Tool Co., Inc., Menominee, Mich.

[21] Appl. No.: 439,384

[22] Filed: May 11, 1995

[51] Int. Cl.⁶ ................................................ B23B 51/04
[52] U.S. Cl. ..................................... 408/204; 408/703
[58] Field of Search ................................. 408/204–206, 408/703, 207–209

[56] References Cited

U.S. PATENT DOCUMENTS 3,387,637   6/1968  Ferguson et al. ................... 408/204
3,548,687  12/1970  Holloway ............................. 408/204
4,056,152  11/1977  Lacey ................................... 408/204
5,074,722  12/1991  Cochran ............................... 408/204

*Primary Examiner*—Steven C. Bishop
*Attorney, Agent, or Firm*—Michael, Best & Friedrich

[57]     ABSTRACT

A cylindrical cutter for use with a power drill including a base, a cylindrical wall extending from the base, a plurality of cutting teeth, and a plurality of raker teeth with one raker tooth positioned adjacent a cutting tooth.

27 Claims, 1 Drawing Sheet

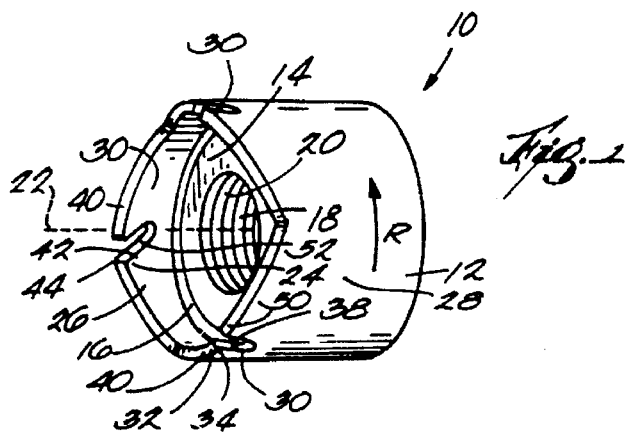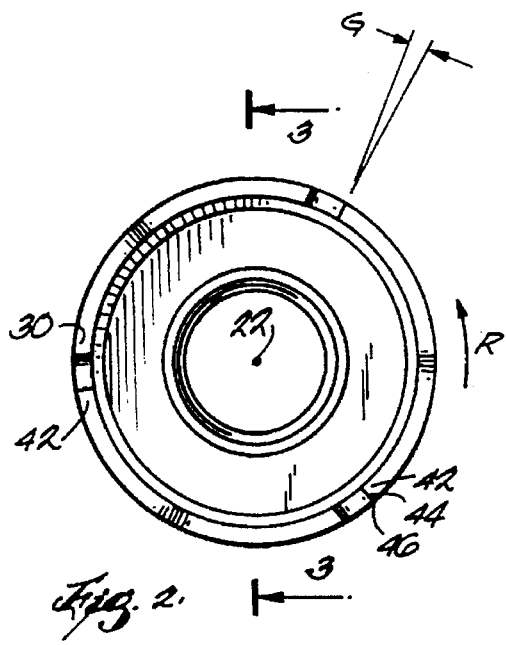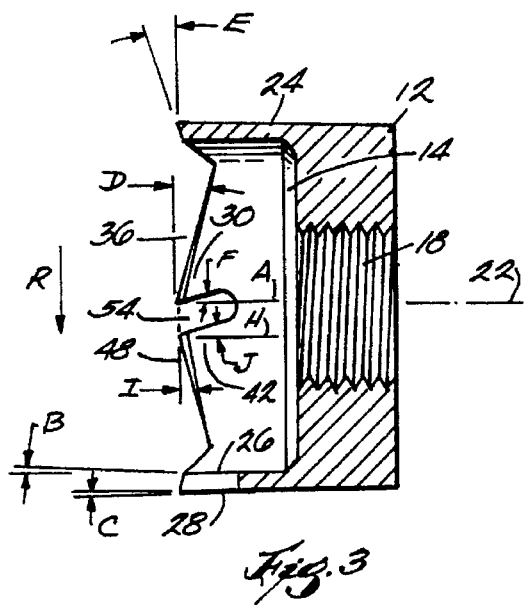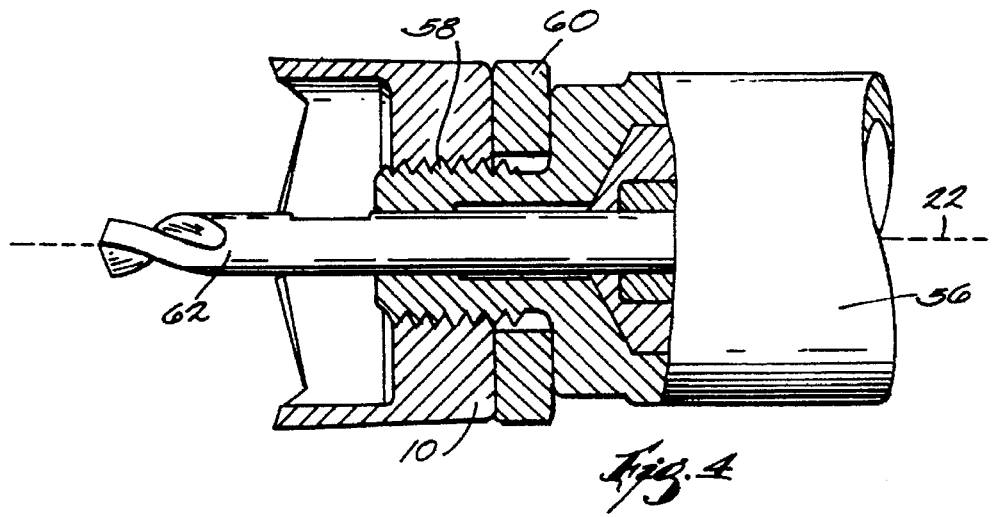

CYLINDRICAL CUTTER

FIELD OF THE INVENTION

The invention relates to cylindrical cutters, and more particularly, to cutters having both cutting teeth and raker teeth.

BACKGROUND OF THE INVENTION

Hole cutters typically consist of a cylindrical cutter that is removably secured in the chuck of a power drill. Using cylindrical cutters to drill holes in certain material such as stainless steel can be difficult due to the toughness of the material and the material's tendency to cold-work and harden when being drilled. Furthermore, some cylindrical cutters have cutting teeth that are more likely to get caught on the edge of the cut. When this happens, the drill motor may stall, the cutter may break, or the operator may be thrown off balance.

SUMMARY OF THE INVENTION

The invention provides a cylindrical cutter having a base and a generally cylindrical wall extending from the base and terminating in a plurality of cutting teeth. The base has a central axis which defines an axis of rotation for the cutter. The cutting teeth terminate in a cutting edge defining a common first plane perpendicular to the axis of rotation. The cutting teeth have an inclination relative to the direction of rotation of the cutter. A plurality of raker teeth are located on the cylindrical wall with one raker tooth adjacent each cutting tooth. The raker teeth terminate in an edge defining a common second plane which is perpendicular to the axis of rotation and which is spaced axially inwardly from the first plane toward the base. The raker teeth have an inclination relative to the direction of rotation of the cutter which is opposite to the inclination of the cutting teeth.

It is an object of the present invention to provide an improved cylindrical cutter that drills holes more efficiently.

It is a further objection of the invention to provide a cylindrical cutter that overcomes some of the inherent difficulties in working with materials, such as stainless steel, that are tough and have a tendency to cold-work and harden when being machined.

It is a further objection of the invention to provide a cylindrical cutter that enables a faster cut with less wear on the cutting teeth.

It is a further objection of the invention to provide a cylindrical cutter that is able to be resharpened more quickly.

It is a further objection of the invention to provide a cylindrical cutter that includes a small number of cutting teeth and a raker tooth adjacent each cutting tooth.

It is a further objection of the invention to provide a cylindrical cutter that reduces the occurrences of a cutting tooth getting caught on the edge of the cut.

Other features and advantages of the invention will become apparent to those of ordinary skill in the art upon review of the following detailed description, claims, and drawings.

BRIEF DESCRIPTION OF THE DRAWINGS

FIG. 1 is a perspective view of the cylindrical cutter embodying the invention;

FIG. 2 is an top plan view of the cutter;

FIG. 3 is a view taken along line 3—3 of FIG. 2; and

FIG. 4 is a partial sectional view of the cutter attached to an adapter.

Before one embodiment of the invention is explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

Referring now to the drawings, there is shown in FIG. 1 the cylindrical cutter 10 embodying the invention. Preferably, the cutter 10 is fabricated out of conventional tool steel and preferably out of M2 alloy steel.

The cutter includes an annular base 12 having a surface 14 with a periphery 16 and having therein a central bore 18. An interior wall 20 of the base 12 defining the bore 18 has thereon threads adapted to secure the cutter 10 to a power drill (not shown). An axis of rotation 22 of the base 12 is centered in the bore 18 and is the axis about which the cutter rotates when powered by the drill. The direction of rotation of the cutter 10 is depicted by arrow R in the Figures.

Referring to FIG. 1, a generally cylindrical wall 24 extends from the periphery 16 of the surface 14 and has an inside surface 26 and an outside surface 28. The wall 24 is generally cylindrical although, preferably, not uniform in depth. Specifically, and with reference to FIG. 3, the wall 24 is inclined axially inwardly in a direction axially outwardly from the base 12 by an angle B and is inclined axially outwardly in a direction axially outwardly from the base 12 by an angle C. In other words, the wall 24 is tapered on both its inside surface 26 and outside surface 28. Preferably, the taper C on the outside surface 28 is 1½ degrees and the taper B on the inside surface is 1 degree. These inclinations or tapers of the wall 24 provide a clearance between the cutter 10 and the work piece which reduces drag and heat build up and eliminates the need for a set. Further, the inclination of the inside surface 26 also aids in removal of the slug of material after the hole has been drilled.

Referring back to FIG. 1, portions of the cylindrical wall 24 terminate in a plurality of cutting teeth 30. Each of the cutting teeth 30 extend a predetermined distance A from the surface 14 of the base 12 (FIG. 3). Preferably, and as shown in FIG. 1, the cutter 10 includes three cutting teeth 30 that are equally spaced from one another on the wall 24 so as to be 120 degrees apart. A small number of cutting teeth 30 provides a stable cutting platform where each cutting tooth 30 can cut the same depth of chip from the material being drilled. A small number of cutting teeth 30 also concentrates the turning power of the drill motor and the pressure applied by the operator into a few cutting teeth 30 so that each cutting tooth 30 can cut a deeper chip of the material. Thus, with a smaller number of cutting teeth 30, the cutter 10 is more likely to cut below the cold-worked surface of the material left by a cutting tooth 30 on the previous pass thus enabling a faster cut and less wear on the cutting teeth 30. Even though a small number of cutting teeth 30 are preferred, it should be noted that any number of cutting teeth 30 and a variety of spacings of the cutting teeth 30 relative to each other can be utilized for the cutter 10.

Each of the cutting teeth 30 terminates in a cutting edge 32. Each cutting edge has a radially outer end 34. As shown in FIG. 3, each of the outer ends 34 of the cutting teeth 30 define a plane 36 that is perpendicular to the axis of rotation 22. Generally, each cutting tooth is inclined or slanted relative to the direction of rotation R. More specifically, and with reference to FIGS. 1–3, each cutting tooth 30 has a leading surface 38 and a trailing surface 40 that intersect at the cutting edge 32. The trailing surface 40 is inclined axially outwardly from the base 12 in the direction of rotation R. Preferably, this inclination D is 15 degrees. The trailing surface 40 is also inclined axially outwardly from the base 12 in the direction radially outwardly from the base 12. Preferably, this inclination E is 15 degrees.

The leading surface 38 of each cutting tooth 30 is inclined axially outwardly from the base 12 in the direction of rotation R. Preferably, this inclination F is 15 degrees. The leading surface 38 is also inclined radially outwardly of the base 12 in the direction of rotation R. Preferably, this inclination G, also termed a face angle, is 8 degrees.

Continuing to refer to FIG. 3, a plurality of limiting or raker teeth 42 are also located on the cylindrical wall 24 with one raker tooth 42 being adjacent each of the cutting teeth 30. Preferably, there are three raker teeth 42, with each of raker tooth 42 being equally spaced from one another (FIG. 2). Each of the raker teeth 42 extend a predetermined distance H from the surface 14 of the base 12. The predetermined distance H of each raker tooth 42 is less than the predetermined distance A of each cutting tooth 30. The raker teeth 42 terminate in a raker edge 44 (FIG. 2). Each raker edge 44 has a radially outer end 46. Each of the outer ends 46 define a plane 48 that is perpendicular to the axis of rotation 22. The plane 48 is spaced axially inwardly from the plane 36 relative to the base 12.

Referring to FIGS. 1–3, generally, each raker tooth 42 is inclined or slanted relative to the direction of rotation R. More specifically, each raker tooth 42 has a leading surface 50 and a trailing surface 52 that intersect at the raker edge 44. The leading surface 50 is inclined axially inwardly toward the base 12 in the direction of rotation R. Preferably, that inclination I is 15 degrees. The leading surface 50 is also inclined axially outwardly from the base 12 in the direction radially outwardly from the base 12. Preferably, that inclination E is 15 degrees. The trailing surface 52 of each raker tooth 42 is inclined axially outwardly from the base 12 in the direction of rotation R. Preferably, the angle J is 15 degrees. The trailing surface 52 is parallel to the leading surface 38 of cutting teeth 30.

Each raker tooth 42 is spaced from its adjacent cutting tooth 30 so that the trailing surface 52 of a raker tooth 42 is immediately adjacent a leading surface 38 of a cutting tooth 30. Preferably, and as best shown in FIG. 3, the raker teeth 42 are spaced from the cutting teeth 30 by a U-shaped channel or gullet 54. The gullet 54 is cut so that the trailing surface 52 of the raker teeth 42 is parallel to the leading surface 38 of the cutting teeth 30. The gullets 54 ahead of each of the cutting teeth 30 aid in chip removal and also provides access for a screwdriver or other device to flip out the slug of material from the interior of the cutter 10.

The purpose of the raker teeth 42 is to limit the depth of cutting teeth exposure to the material to be drilled which reduces the chance of the cutting teeth 30 catching on the edge of a cut when breaking through the backside of the material or when cutting a round duct or pipe. When a cutting tooth 30 catches on uncut material, this can stall the drill motor, break the cutter 10 and/or throw the drill operator off balance due to a sudden jolt. Preferably, the cutting teeth 30 have a predetermined distance A that is 0.006" longer than the predetermined distance H of each raker tooth 42.

An important advantage of the cutter 10 is in resharpening. With only a small number of cutting teeth 30, the cutter 10 sharpens faster and requires less accuracy is sharpening because with three cutting teeth 30, if there is some variation in the grind of the cutter, the cutter 10 will still sit flat on the work piece (analogous to a 3-legged stool) and cut three equal chips of material.

Referring to FIG. 4, the cutter 10 is designed to be secured to an adapter 56 which in turn is secured to the drill (not shown) so that the drill rotates both the adapter 56 and the cutter 10 about the axis of rotation 22. The adapter 56 includes a threaded shaft 58 onto which the cutter 10 is threaded. Preferably, a spacer 60 is positioned on the shaft 58 to aid in removal of the cutter 10 after use. As shown in FIG. 4, the adapter 56 also includes a pilot drill bit 62 that aids in centering the hole to be drilled by the cutter 10. The pilot drill bit 62 also keep the cutter 10 centered on the material to be drilled and thus prevents the cutter 10 from straying from the desired drilling position upon contact with the material. The other end of the cutter (not shown) is attached to the power drill in any manner such as by securing the adapter in the chuck of the drill.

We claim:

1. A cylindrical cutter for use with a power drill, said cutter comprising:

a base having a surface and an axis of rotation about which said cutter is rotatable, said base being adapted for operable connection to the drill;

a generally cylindrical wall extending from said surface;

three cutting teeth on said wall, said cutting teeth each extending a predetermined first distance from said surface; and three limiting teeth on said wall with each of said limiting teeth positioned adjacent a respective one of said cutting teeth, said limiting teeth each extending a predetermined distance, less than said first distance, from said surface.

2. A cylindrical cutter as set forth in claim 1 wherein said base includes a periphery and wherein said wall extends from said periphery.

3. A cylindrical cutter as set forth in claim 1 wherein each one of said cutting teeth is spaced from its adjacent limiting tooth.

4. A cylindrical cutter as set forth in claim 1 wherein each of said cutting teeth are equally spaced from each other and each of said limiting teeth are equally spaced from each other.

5. A cylindrical cutter as set forth in claim 1 wherein each of each of said cutting teeth terminate in a cutting edge, wherein each of said limiting teeth terminate in a limiting edge, and wherein said cutting edge and said limiting edge are parallel.

6. A cylindrical cutter as set forth in claim 5 wherein each of said cutting teeth having a leading surface and a trailing surface that intersect at said cutting edge and wherein each of said limiting teeth having a leading surface and a trailing surface that intersect at said limiting edge.

7. A cylindrical cutter as set forth in claim 6 wherein said trailing surface of each of said cutting teeth is inclined axially outwardly from said base in said direction of rotation and is inclined axially outwardly from said base in the direction radially outwardly from said base, wherein said leading surface of each of said cutting teeth is inclined axially outwardly from said base in said direction of rotation and is inclined in radially outwardly of said base in said direction of rotation.

8. A cylindrical cutter as set forth in claim 6 wherein said leading surface of each of said limiting teeth is inclined axially inwardly toward said base in said direction of rotation and is inclined axially outwardly from said base in the direction radially outwardly of said base, wherein said trailing surface of each of said limiting teeth is inclined axially outwardly from said base in said direction of rotation, and wherein said trailing surface of each of said limiting teeth is parallel to said leading edge of each of said respective cutting teeth.

9. A cylindrical cutter as set forth in claim 6 wherein trailing surface of each of said limiting teeth is spaced from said respective adjacent cutting teeth by a gullet.

10. A cylindrical cutter as set forth in claim 1 wherein said wall is inclined axially inwardly in a direction axially outwardly from said base and is inclined axially outwardly in a direction axially outwardly from said base.

11. A cylindrical cutter comprising, in combination,
a base,
a generally cylindrical wall extending from said base and terminating in a plurality of cutting teeth, said cylindrical wall having a central axis which defines an axis of rotation for said cutter,
each of said cutting teeth having a leading surface and a trailing surface that intersect at a cutting edge, said cutting edge defining a common first plane perpendicular to said axis of rotation, each of said cutting teeth having an inclination relative to the direction of rotation of said cutter, and
a plurality of raker teeth located on said cylindrical wall with one adjacent each of said plurality of cutting teeth, each of said raker teeth having a leading surface and a trailing surface that intersect at a raker edge, said raker edge defining a common second plane which is perpendicular to said axis of rotation and which is spaced axially inwardly from said first plane toward said base, each of said raker teeth having an inclination relative to said direction of rotation which is opposite to said inclination of said cutting teeth;
said trailing surface of said cutting teeth and said leading surface of said raker teeth are planar.

12. A cylindrical cutter as set forth in claim 11 wherein said plurality of cutting teeth is three cutting teeth.

13. A cylindrical cutter as set forth in claim 11 wherein said base has therein a central bore.

14. A cylindrical cutter as set forth in claim 11 wherein said base includes a periphery and wherein said cylindrical wall extends from said periphery.

15. A cylindrical cutter as set forth in claim 11 wherein each one of said cutting teeth is spaced from its adjacent raker tooth.

16. A cylindrical cutter as set forth in claim 11 wherein each of said cutting teeth are equally spaced from each other and each of said raker teeth are equally spaced from each other.

17. A cylindrical cutter as set forth in claim 10 wherein each of said cutting teeth is spaced from its adjacent raker teeth by gullets in said wall between said cutting teeth and said adjacent raker teeth.

18. A cylindrical cutter as set forth in claim 11 wherein said cutting edge and said raker edge are parallel.

19. A cylindrical cutter as set forth in claim 12 wherein said trailing surface of each of said cutting teeth is inclined axially outwardly from said base in said direction of rotation and is inclined axially outwardly from said base in the direction radially outwardly from said base, wherein said leading surface of each of said cutting teeth is inclined axially outwardly from said base in said direction of rotation and is inclined in radially outwardly of said base in said direction of rotation.

20. A cylindrical cutter as set forth in claim 12 wherein said leading surface of each of said raker teeth is inclined axially inwardly toward said base in said direction of rotation and is inclined axially outwardly from said base in the direction radially outwardly of said base, wherein said trailing surface of each of said raker teeth is inclined axially outwardly from said base in said direction of rotation, and wherein said trailing surface of each of said raker teeth is parallel to said leading edge of each of said respective cutting teeth.

21. A cylindrical cutter as set forth in claim 11 wherein said trailing surface of each of said raker teeth is spaced from said respective adjacent cutting teeth by a gullet.

22. A cylindrical cutter as set forth in claim 11 wherein said wall is inclined axially inwardly in a direction axially outwardly from said base and is inclined axially outwardly in a direction axially outwardly from said base.

23. A cylindrical cutter comprising:
a base having an axis of rotation about which said cutter rotates and a direction of rotation;
a generally cylindrical wall extending from said base;
three cutting teeth on said wall, each of said cutting teeth terminating in a cutting edge having a radially outer end defining a first plane perpendicular to said axis of rotation, each of said cutting teeth having a leading surface and a trailing surface that intersect at said cutting edge, said trailing surface is inclined axially outwardly from said base in said direction of rotation and is inclined axially outwardly from said base in the direction radially outwardly from said base, said leading surface is inclined axially outwardly from said base in said direction of rotation and is inclined in radially outwardly of said base in said direction of rotation; and
three raker teeth located on said wall, each of said raker teeth terminating in a raker edge having a radially outer end defining a second plane perpendicular to said axis of rotation, said second plane being is spaced axially inwardly from said first plane toward said base, each of said raker teeth having a leading surface and a trailing surface that intersect at said raker edge, said leading surface of each of said raker teeth is inclined axially inwardly toward said base in said direction of rotation and is inclined axially outwardly from said base in the direction radially outwardly of said base, said trailing surface of each of said raker teeth is inclined axially outwardly from said base in said direction of rotation, and each of said raker teeth is positioned adjacent to and spaced from a respective one of said cutting teeth so that said trailing surface of each of said raker teeth is immediately adjacent said leading surface of each of said respective cutting teeth;
said trailing surface of said cutting teeth and said leading surface of said raker teeth are planar.

24. A cylindrical cutter as set forth in claim 23 wherein said cutting edge and said raker edge are parallel.

25. A cylindrical cutter as set forth in claim 23 wherein said trailing surface of each of said raker teeth is parallel to said leading edge of each of said respective cutting teeth.

26. A cylindrical cutter as set forth in claim 23 wherein said trailing surface of each of said raker teeth is spaced from said respective adjacent cutting teeth by a gullet.

27. A cylindrical cutter as set forth in claim 23 wherein said generally cylindrical wall is inclined axially inwardly in a direction axially outwardly from said base and is inclined axially outwardly in a direction axially outwardly from said base.

* * * * *

UNITED STATES PATENT AND TRADEMARK OFFICE
CERTIFICATE OF CORRECTION

PATENT NO.   : 5,639,193
DATED        : June 17, 1997
INVENTOR(S)  : James R. Anderson It is certified that error appears in the above-indentified patent and that said Letters Patent is hereby corrected as shown below:

Column 1, line 39, "objection" should be --object--;
         line 44, "objection" should be --object--;
         line 47, "objection" should be --object--;
         line 49, "objection" should be --object--; and
         line 52, "objection" should be --object--.

Claim 17, Column 5, line 54, "10" should be --9--.

Claim 19, Column 5, line 59, "12" should be --11--.

Claim 20, Column 6, line 1, "12" should be --11--.

Signed and Sealed this

Sixteenth Day of December, 1997

Attest:

BRUCE LEHMAN

*Attesting Officer*       *Commissioner of Patents and Trademarks*